July 28, 1936.                J. F. PHILLIPS                2,048,946
                                 CAR STOP
                            Filed Oct. 28, 1935
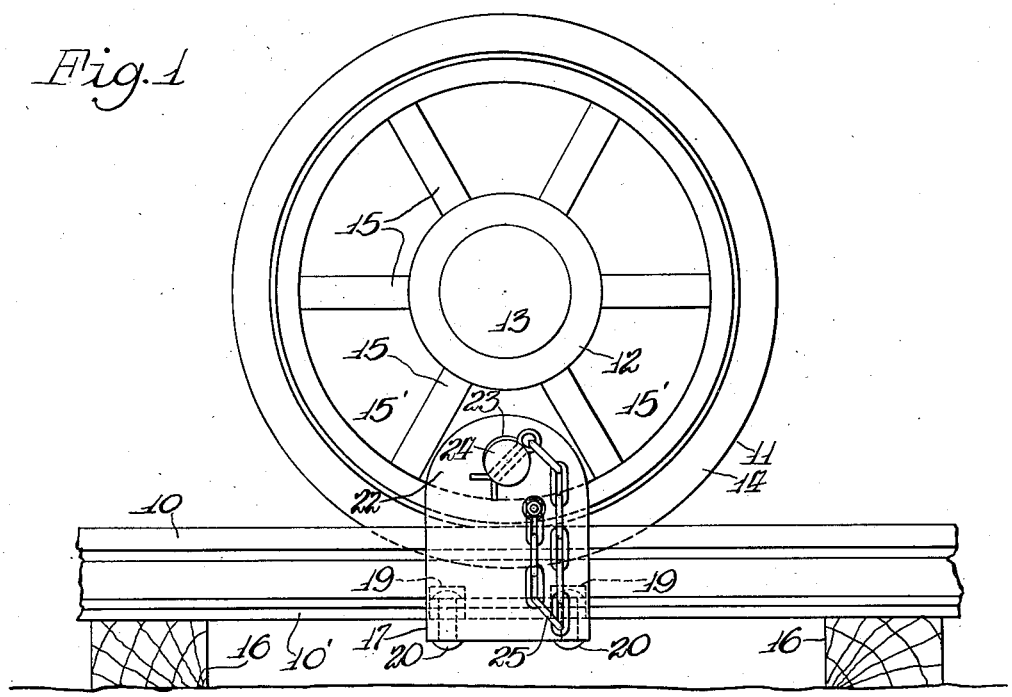
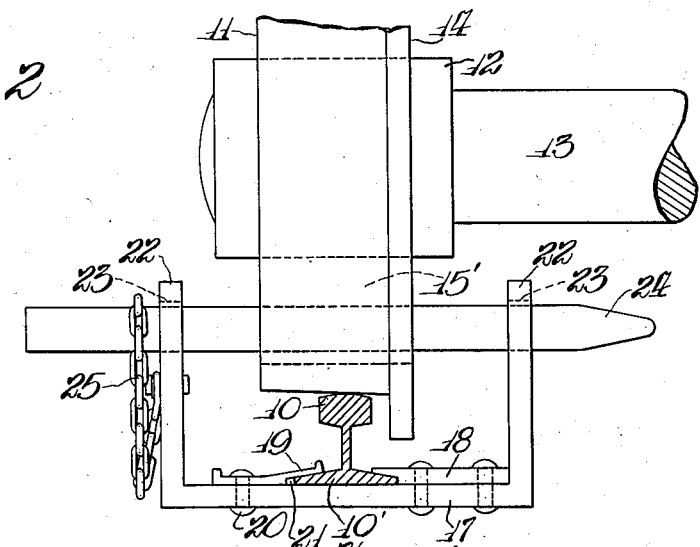
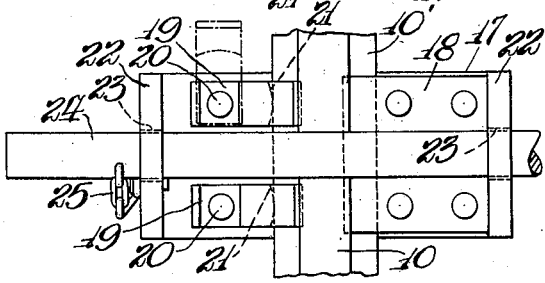
Inventor
James F. Phillips
By V. T. Lassagne
Atty.

Patented July 28, 1936

2,048,946

UNITED STATES PATENT OFFICE 2,048,946

CAR STOP

James F. Phillips, Benham, Ky.

Application October 28, 1935, Serial No. 47,052

7 Claims. (Cl. 188—62)

This invention relates to a device for locking a car wheel to a track rail, and more particularly to a removable unit adapted to cooperate with the car wheel and the track rail for locking the car wheel to the rail.

It is often desirable in the operation of rail cars, especially those of the type used to convey ore, coal etc., in mines, to halt the cars in certain positions on the tracks for safety or loading purposes.

Therefore, it is an object of this invention to provide a device to accomplish the aforesaid purpose.

Another object is to provide such a device that may be readily secured to and removed from the track rail without interference with the normal operation of the cars over the rails.

Another object is to provide such a device that after being secured to a rail it may readily cooperate with the wheel in such a manner as to lock the car against further movement in either direction.

Another object is to provide a device with a minimum of parts, being compact in construction and available for use with a minimum of time and effort.

Other objects will be apparent from the following description, claims and drawing, in which:

Figure 1 is a side view embodying a preferred form of the invention and showing the same in cooperation with a car wheel and track rail;

Figure 2 is an end elevational view of the same; and,

Figure 3 is a plan view of the locking device in place on the track rail showing in dotted lines the means for removing the device from the rail, the wheel being excluded from the view.

One of a pair of track rails of the conventional type is shown at 10, only one being shown as necessary to disclose and describe the invention. A wheel is shown at 11 said wheel being one of a plurality of the usual rail car wheels used to support and carry a rail car, not shown.

The wheel 11 has the usual hub 12 which is keyed to the transverse axle 13. The axle 13 is carried in a box bearing on the rail car, not shown, as is common in the construction of rail cars. The wheel 11 is formed with a flanged tire 14 and a plurality of spokes 15. Thus the wheel 11 is divided by the spokes 15 into a plurality of spaced openings 15' which have a certain definite purpose to appear later.

The track rail 10 is secured to the conventional cross ties 16 above the track bed and has secured to its under side a transverse member in the form of the locking bracket 17. These locking brackets 17 may be secured to the track rail 10 at intervals wherever desired according to the positions where the car must be stopped and held against further movement.

On the upper surface of the locking bracket 17 and at one side of the rail flange or base 10' is a securing member in the form of a preformed clamp 18 riveted or otherwise secured to the bracket 17. On the same surface of the locking bracket 17, and at the opposite side of the track rail 10, are second securing members formed as the clips 19.

These clips 19 are pivoted as at 20 and may be turned away from or to the rail flange or base 10' as indicated in Figure 3. The clips 19 on their undersides are formed with the arcuate wedging surfaces 21 for a purpose later to appear.

At either end the locking bracket 17 is provided with integral upstanding extensions 22 which extend upward on both sides of the track rail 10 and the wheel 11. These extensions are provided with transversely aligned openings in the form of the bores 23, which are in alignment with any one of the spaced openings 15' in the wheel 11. A locking member in the form of the pointed pin 24 is inserted through the aligned openings 23 and 15'. A flexible connection or chain 25 secured at one end to one of the upstanding extensions 22 and at the other to the pin 24 insures against the loss or misplacing of the pin 24 when not in use.

It may be readily seen that when the locking bracket 17 is secured in position on the rail 10 by the clamp 18 and the securing clips 19 it is immovable in relation to the rail. Thus, when the car is stopped with one of its wheels 11 positioned between the upstanding extensions 22 on the bracket 17, the pin 24 is inserted through the openings 23 in the upstanding extensions and through one of the openings 15' between the spokes 14 in the wheel 11 and the car is locked against further movement in either direction.

When the car is to be released the pin 24 is removed and allowed to depend from the chain 25 until needed for further locking. The locking bracket 17 is left in position on the track rail without interference with the operation of cars over the rails.

When the bracket 17 is to be removed from the track rail 10 the clips 19 are pivoted at 20 outwardly from the track rail and the bracket 17 slipped from the track rail base 10'.

When it is desired to attach the bracket 17 to the track rail 10 the clamp 18 is hooked over one side of the flanged bottom or base 10' of the track rail 10 and the bracket swung upward until the pivoted clips 19 may be turned over the opposite edge of the flanged bottom or base of the rail. The clips are turned inward toward the rail and the curved wedging surfaces 21 press the bracket securely in position, insuring an immovable connection between the rail 10 and the locking bracket 17.

It will be evident that there has been provided for a track rail a safety device in the nature of a mine car stop, which may be readily attached to or detached from the track rail. Furthermore, the safety device is simple, practicable, and cheap to manufacture.

The preferred embodiment of the invention herein disclosed is capable of certain modifications without departure from the scope of the invention to be defined in the following claims.

What is claimed is:

1. In a device for locking a wheel to a rail, the combination with a rail, of a wheel adapted to travel on the rail, a member secured to the rail, extensions on said member, said extensions being provided with openings, and a locking member adapted to be inserted through said openings to engage the wheel for locking the wheel to the rail.

2. In a device for locking a wheel to a rail, the combination with a rail, of a wheel adapted to travel on the rail, said wheel being provided with spaced openings therein, a transverse member detachably secured to the rail, upstanding extensions at either end of said member and at either side of the rail and wheel, said extensions being provided with aligned openings therein, and a locking member adapted to be inserted through the aligned openings and any one of the spaced openings in the wheel for locking the wheel to the rail.

3. In a device of the class described, a member adapted to be secured to a track rail, upstanding extensions on said member, said extensions being provided with openings therein, securing means attached to the member and adapted to engage one side of said rail, second securing means movably attached to the member and adapted to engage the opposite side of the rail for securing the member to the rail, and a locking member adapted to be inserted through the openings in the upstanding extensions to form an obstruction above the rail.

4. In a device of the class described, a transverse member detachably secured to a track rail, upstanding extensions on said transverse member, said extensions being provided with aligned openings therein, securing means attached to the transverse member and adapted to engage one side of said rail, second securing means movably attached to the transverse member and adapted to engage the opposite side of the rail for attaching and detaching the transverse member to and from the rail, and a removable locking member received by the aligned openings in the upstanding extensions to form a removable obstruction above the rail.

5. In a device of the class described, a transverse member detachably secured to the base of a track rail, upstanding extensions at either end of said transverse member with the track rail therebetween, said extensions being provided with aligned openings therein substantially above the upper surface of the track rail, securing means attached to the transverse member between one of the upstanding extensions and the track rail and adapted to engage that side of the base of the track rail, second securing means pivotally attached to the member between the other upstanding extension and the track rail and adapted to engage the opposite side of the base of the track rail for detachably securing the transverse member to the rail in fixed position, a locking pin removably received by the aligned openings in the upstanding extensions and across the rail to form a removable obstruction thereabove, and a flexible connection between the transverse member and said locking pin.

6. In a device of the class described, the combination with a track rail having a flanged base, of a transverse member, upstanding extensions at either end of said transverse member, securing means on the transverse member adapted to engage one side of the flanged base of the track rail, and second securing means on the transverse member adapted to engage the other side of the flanged base, said second securing means being formed with arcuate wedging surfaces adapted to wedge the flanged base of the track rail between the first securing means and the second securing means to secure the transverse member to the track rail.

7. In a device of the class described, the combination with a rail having a flanged base, of a transverse member adapted to be removably secured to said track rail, upstanding extensions at either end of said transverse member with the track rail therebetween, securing means attached to the transverse member at one side thereof between the track rail and one of the upstanding extensions said securing means adapted to engage that side of the flanged base of the track rail, second securing means movably attached to the transverse member between the track rail and the other upstanding extension, said second securing means adapted to engage the other side of the flanged base of the track rail, and arcuate wedging surfaces formed on the second securing means for wedging the rail between the first and second securing means.

JAMES F. PHILLIPS.